(12) United States Patent
Taylor et al.

(10) Patent No.: US 11,654,949 B2
(45) Date of Patent: May 23, 2023

(54) MULTI CHILD STROLLER

(71) Applicant: WONDERLAND SWITZERLAND AG, Steinhausen (CH)

(72) Inventors: Andrew J. Taylor, Mohnton, PA (US); Robert E. Haut, Merion Station, PA (US)

(73) Assignee: WONDERLAND SWITZERLAND AG, Steinhausen (CH)

( * ) Notice: Subject to any disclaimer, the term of this patent is extended or adjusted under 35 U.S.C. 154(b) by 0 days.

(21) Appl. No.: 17/456,300

(22) Filed: Nov. 23, 2021

(65) Prior Publication Data

US 2022/0081018 A1 Mar. 17, 2022

Related U.S. Application Data

(63) Continuation of application No. 16/868,555, filed on May 7, 2020, now Pat. No. 11,208,136.

(60) Provisional application No. 62/844,333, filed on May 7, 2019, provisional application No. 62/884,375, filed on Aug. 8, 2019.

(51) Int. Cl.
| | |
|---|---|
| *B62B 7/00* | (2006.01) |
| *B62B 7/14* | (2006.01) |
| *B60N 2/28* | (2006.01) |
| *B62B 7/08* | (2006.01) |
| *B62B 7/06* | (2006.01) |

(52) U.S. Cl.
CPC ............... *B62B 7/008* (2013.01); *B60N 2/28* (2013.01); *B62B 7/06* (2013.01); *B62B 7/08* (2013.01); *B62B 7/14* (2013.01); *B62B 7/142* (2013.01); *B62B 7/145* (2013.01)

(58) Field of Classification Search
CPC .. B62B 7/008; B62B 7/06; B62B 7/14; B62B 7/142
See application file for complete search history.

(56) References Cited

U.S. PATENT DOCUMENTS 3,235,279 A * 2/1966 Smith ................. B62B 7/12
280/648
3,998,490 A * 12/1976 Lallave ............... A47D 13/025
280/47.35
(Continued)

FOREIGN PATENT DOCUMENTS

| CN | 105984481 A | 10/2016 |
| CN | 107176197 A | 9/2017 |

(Continued)

*Primary Examiner* — Erez Gurari
(74) *Attorney, Agent, or Firm* — Fay Kaplun & Marcin, LLP

(57) ABSTRACT

A child stroller includes a stroller frame and a first seat. The stroller frame has two sections capable of being folded and unfolded relative to each other. The first seat is disposed on one of the two sections in a detachable manner. The first seat includes a supporting unit and a first seat frame. The first seat frame is adapted to hold the supporting unit. The first seat frame includes a seat hub, an upper seat tube and a lower seat tube. The seat hub is disposed on the stroller frame. The upper seat tube is disposed on the seat hub, and the supporting unit is slidably disposed on the upper seat tube. The lower seat tube is disposed on the seat hub and detachably connected to the supporting unit.

19 Claims, 15 Drawing Sheets

(56) References Cited

U.S. PATENT DOCUMENTS

| | | | | |
|---|---|---|---|---|
| 6,086,087 | A * | 7/2000 | Yang | B62B 7/14 |
| | | | | 280/658 |
| 6,561,526 | B1 | 5/2003 | Towns | |
| 9,227,650 | B2 * | 1/2016 | Gillett | B62B 9/28 |
| 9,517,787 | B2 | 12/2016 | Zehfuss | B62B 7/062 |
| 9,849,903 | B1 * | 12/2017 | Lai | B62B 7/142 |
| 10,293,843 | B2 * | 5/2019 | Naslain | B62B 9/104 |
| 2015/0232114 | A1 | 8/2015 | Gillett | |
| 2019/0217879 | A1 * | 7/2019 | Gibson | B62B 9/12 |
| 2020/0079414 | A1 * | 3/2020 | Haut | B62B 9/26 |
| 2020/0331510 | A1 * | 10/2020 | Kim | B62B 7/142 |
| 2020/0353966 | A1 * | 11/2020 | Taylor | B62B 7/142 |
| 2022/0212708 | A1 * | 7/2022 | Zhong | B62B 7/06 |

FOREIGN PATENT DOCUMENTS

| | | |
|---|---|---|
| CN | 208053425 U | 11/2018 |
| CN | 208069761 U | 11/2018 |

* cited by examiner

MULTI CHILD STROLLER

CROSS REFERENCE TO RELATED APPLICATION

The present application is a Continuation of U.S. patent application Ser. No. 16/868,555 filed May 7, 2020, now U.S. Pat. No. 11,208,136; which claims priority to U.S. Provisional Patent Application Ser. Nos. 62/884,375 filed Aug. 8, 2019 and 62/844,333 filed May 7, 2019. The disclosures of the above application(s)/patent(s) are incorporated herewith by reference.

BACKGROUND OF THE INVENTION

1. Field of the Invention

The present invention relates to a child stroller, and more particularly, to a child stroller with a functional bench seat and a small size in the folding mode.

2. Description of the Prior Art

A conventional double child stroller includes a plurality of structural components assembled in a complicated manner, and requires removal of some structural components before folding the double child stroller into a compact mode. The conventional double child stroller typically has a large folded size and has a drawback of inconvenient storage. Another conventional double child stroller that can be folded more compactly has drawbacks of a minimal seat for the occupant and smaller basket storage, and does not offer a raised seat for a younger child to be near the parent.

SUMMARY OF THE INVENTION

The present invention provides a child stroller with a functional bench seat and a small size in the folding mode for solving above drawbacks.

According to the claimed invention, a child stroller includes a stroller frame and a first seat. The stroller frame has two sections capable of being folded and unfolded relative to each other. The first seat is disposed on one of the two sections in a detachable manner. The first seat includes a supporting unit and a first seat frame. The first seat frame is adapted to hold the supporting unit. The first seat frame includes a seat hub, an upper seat tube and a lower seat tube. The seat hub is disposed on the stroller frame. The upper seat tube is disposed on the seat hub, and the supporting unit is slidably disposed on the upper seat tube. The lower seat tube is disposed on the seat hub and detachably connected to the supporting unit.

According to the claimed invention, the upper seat tube is rotated relative to the stroller frame via the seat hub. The lower seat tube is movably connected to the seat hub and adapted to slide the supporting unit relative to the upper seat tube when the stroller frame is folded.

According to the claimed invention, the upper seat tube and the lower seat tube are rotated relative to the stroller frame via the seat hub.

According to the claimed invention, the supporting unit is a first seat unit. The first seat unit includes a first seat back and a first seat body detachably disposed on the first seat frame.

According to the claimed invention, the first seat back is slidably connected to an upper end of the upper seat tube, and the first seat body is slidably connected to a lower end of the upper seat tube.

According to the claimed invention, the first seat back is engaged with the upper seat tube, and the first seat body is engaged with the lower seat tube.

According to the claimed invention, the first seat unit further includes a textile product installed on the first seat back and the first seat body, and adapted to move the first seat back or the first seat body relative to the upper seat tube when the stroller frame is folded or unfolded.

According to the claimed invention, the first seat back includes an upper sliding slot portion and a lower sliding slot portion. The upper sliding slot portion is assembled with the upper end of the upper seat tube, and the lower sliding slot portion is assembled with the lower seat tube.

According to the claimed invention, the first seat back further includes a resilient locking portion disposed on the lower sliding slot portion and adapted to block the lower seat tube, for preventing the first seat unit and the first seat frame from separation.

According to the claimed invention, the first seat back is removed from the first seat frame when the upper sliding slot portion is separated from the upper seat tube and the resilient locking portion is unlocked to separate the lower sliding slot portion from the lower seat tube.

According to the claimed invention, the first seat body includes a front sliding slot portion assembled with the lower end of the upper seat tube.

According to the claimed invention, the front sliding slot portion is separated from the upper seat tube to remove the first seat body from the first seat frame.

According to the claimed invention, when the stroller frame is folded, the lower seat tube abuts against and moves relative to a second seat of the child stroller, so as to move the first seat unit close to the first seat frame for unfolding the first seat back and the first seat body.

According to the claimed invention, the first seat back includes a first engaging portion and a resilient constraining portion. The upper seat tube includes a second engaging portion slidably engaged with the first engaging portion. The resilient constraining portion abuts against part of the second engaging portion to constrain relative motion between the first engaging portion and the second engaging portion.

According to the claimed invention, the first seat body includes a clipping portion and a resilient restraining portion. The clipping portion clips the lower seat tube, and the resilient restraining portion abuts against the lower seat tube to prevent the lower seat tube and the clipping portion from separation.

According to the claimed invention, the supporting unit is an infant carrier detachably disposed on the seat hub.

According to the claimed invention, the stroller frame includes a front leg member, a rear leg member, a supporting member and a handle member. The supporting member is rotatably disposed between the front leg member and the rear leg member. The front leg member is rotatably connected to an end of the handle member. The rear leg member is rotatably connected to a portion of the handle member adjacent to the foresaid end.

According to the claimed invention, the stroller frame further includes a fastening member disposed between the front leg member and the handle member, and adapted to constrain relative position between the front leg member and the handle member for steadying the stroller frame in a folding mode or a service mode.

According to the claimed invention, the front leg member includes a first wheel, and the rear leg member includes a second wheel.

According to the claimed invention, the handle member is disposed above the front leg member and the rear leg member. The front leg member and the rear leg member are defined as a lower section of the two sections. The handle member is defined as an upper section of the two sections.

According to the claimed invention, the stroller frame further includes a first seat link and a second seat link. A lower end of the second seat link is rotatably disposed on the rear leg member. Two ends of the first seat link are respectively connected to an upper end of the second seat link and the handle member in a rotatable manner.

According to the claimed invention, the first seat link includes an assembling portion, and the seat hub includes a latching portion. The latching portion is detachably assembled with the assembling portion to fix the first seat frame on the stroller frame.

According to the claimed invention, the child stroller further includes a bench seat rotatably disposed on the other section of the two sections.

According to the claimed invention, the bench seat is rotatably connected to the rear leg member and the supporting member of the stroller frame. The bench seat includes a first buckling portion, and the supporting member includes a second buckling portion. The first buckling portion is buckled with the second buckling portion to steady the bench seat in a service mode.

According to the claimed invention, the bench seat further includes a resilient plate portion and an actuating component. The first buckling portion is disposed on the resilient plate portion. The actuating component is connected to the resilient plate portion and stretches toward a seat surface of the bench seat. The resilient plate portion is resiliently deformed by the actuating component to separate the first buckling portion from the second buckling portion.

According to the claimed invention, the bench seat further includes a rib structure adapted to abut against the supporting member for constraining a rotary angle of the bench seat.

According to the claimed invention, the child stroller further includes a stand platform disposed on the other section and adjacent to the bench seat.

According to the claimed invention, the child stroller further includes a second seat detachably disposed on the other section of the two sections.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 11 to FIG. 13 are diagram of the first seat in folding and unfolding phases according to the embodiment of the present invention.

DETAILED DESCRIPTION

Figure 1:
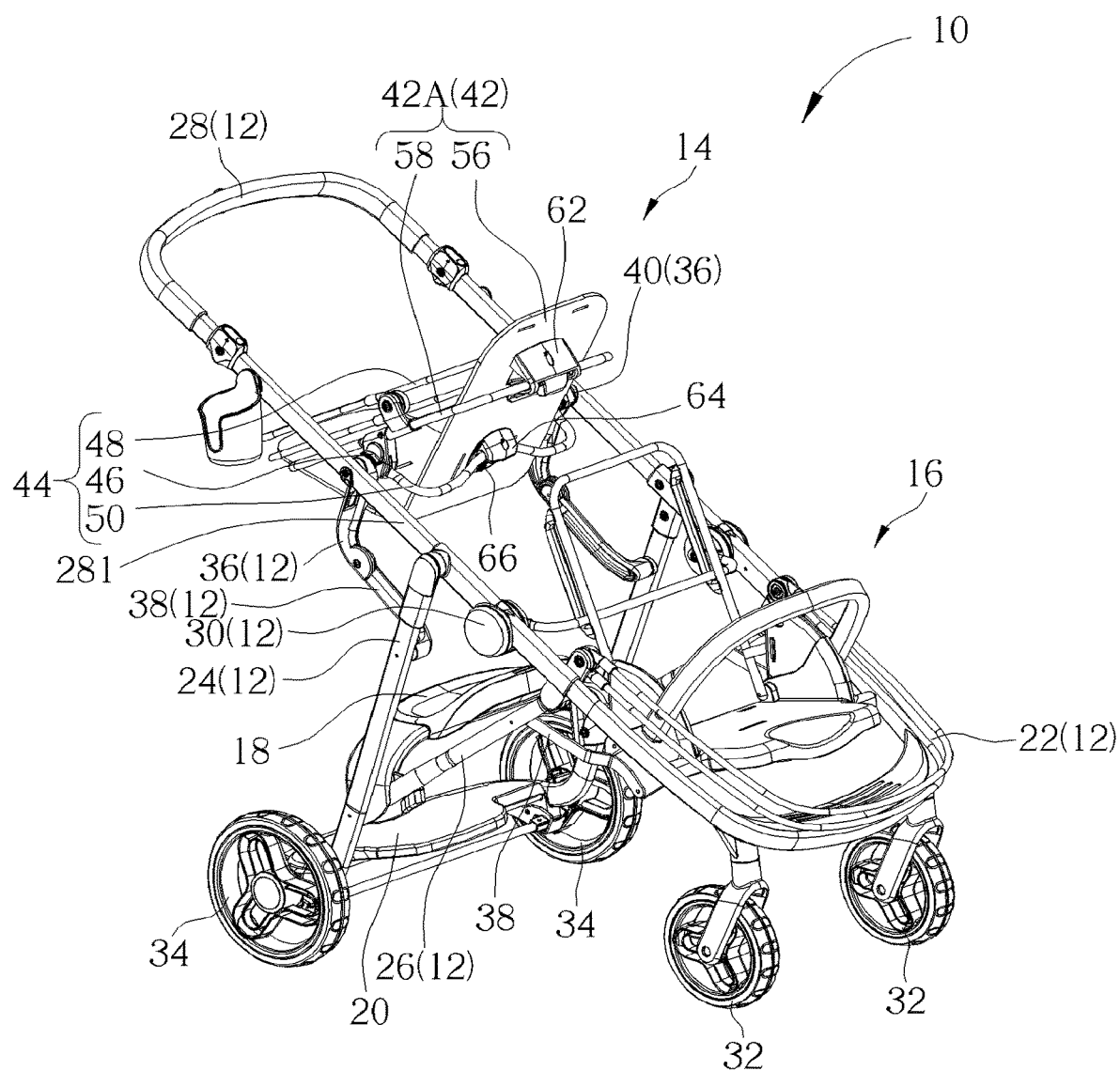
FIG. 1 is a diagram of a child stroller in a service mode according to an embodiment of the present invention.
Figure 2:
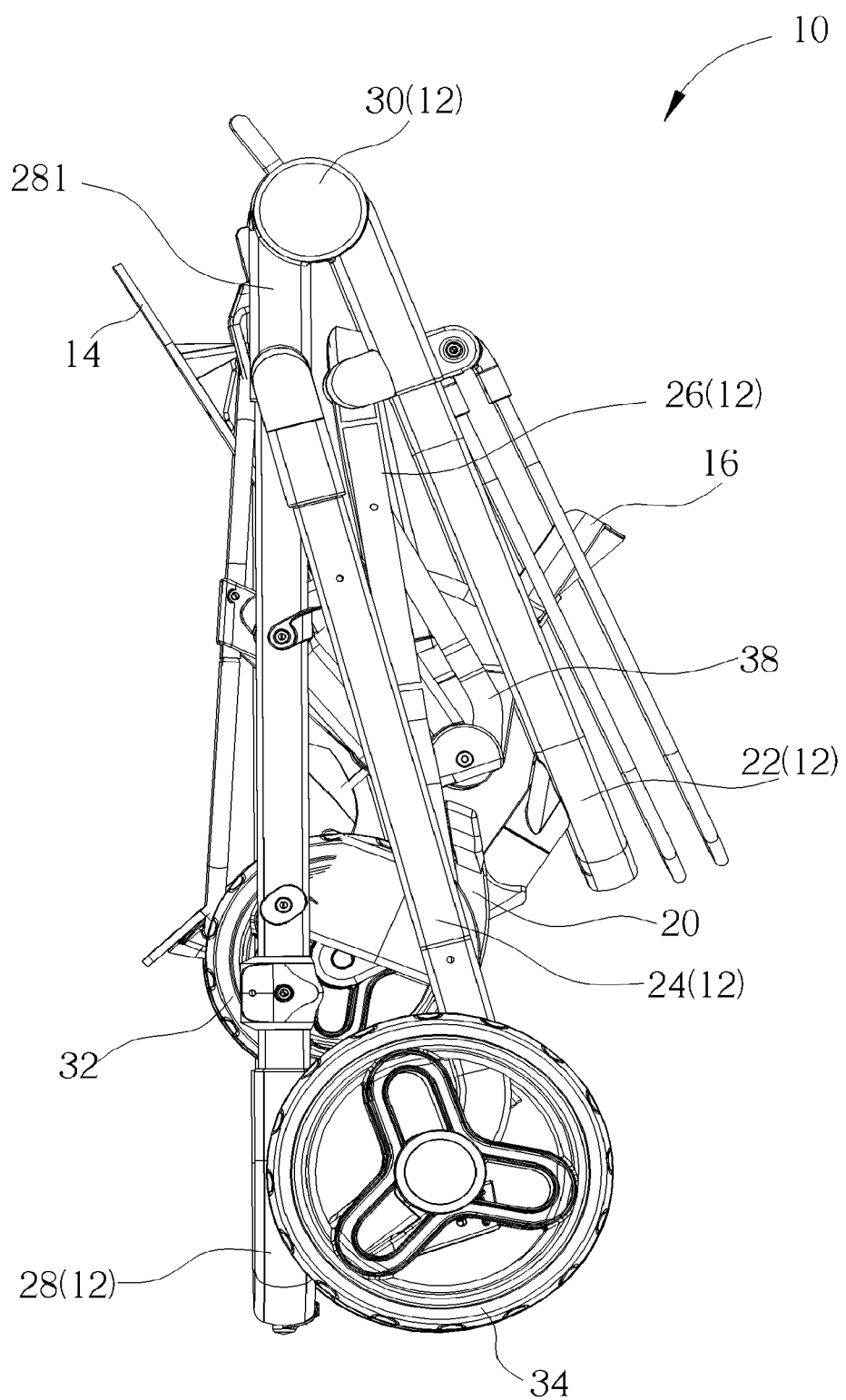
FIG. 2 is a diagram of the child stroller in a folding mode according to the embodiment of the present invention.

Please refer to FIG. 1 and FIG. 2. FIG. 1 is a diagram of a child stroller 10 in a service mode according to an embodiment of the present invention. FIG. 2 is a diagram of the child stroller 10 in a folding mode according to the embodiment of the present invention. The child stroller 10 can include a stroller frame 12, a first seat 14, a second seat 16, a bench seat 18 and a stand platform 20. The stroller frame 12 can include a front leg member 22, a rear leg member 24, a supporting member 26, a handle member 28 and a fastening member 30. The supporting member 26 can be rotatably disposed between the front leg member 22 and the rear leg member 24. One or several first wheels 32 can be disposed on a bottom of the front leg member 22. A top of the front leg member 22 can be rotatably connected an end 281 of the handle member 28.

The rear leg member 24 can be rotatably connected to a portion of the handle member 28 adjacent to the end 281, and have one or several second wheels 34. The fastening member 30 can be disposed between the front leg member 22 and the handle member 28, and used to constrain relative position between the front leg member 22 and the handle member 28, so as to steady the stroller frame 12 in the service mode shown in FIG. 1 or in the folding mode shown in FIG. 2. The handle member 28 can be disposed above the front leg member 22 and the rear leg member 24. The front leg member 22 and the rear leg member 24 can be defined as a lower section of the stroller frame 12; the handle member 28 can be defined as an upper section of the stroller frame 12.

The stroller frame 12 can further include a first seat link 36 and a second seat link 38. A lower end of the second seat link 38 can be rotatably disposed on the rear leg member 24. Two ends of the first seat link 36 can be respectively connected to an upper end of the second seat link 38 and the handle member 28 in a rotatable manner. The rear leg member 24, the handle member 28, the first seat link 36 and the second seat link 38 can be assembled to set as a four-bar linkage mechanism of the stroller frame 12, so that the child stroller 10 can be folded and unfolded easily. The first seat link 36 may include an assembling portion 40.

The upper section and the lower section of the stroller frame 12 can be folded and unfolded relative to each other. The first seat 14 can be detachably disposed on the upper section, such as the handle member 28. The second seat 16 can be detachably disposed on the lower section, such as somewhere between the front leg member 22 and the supporting member 26. The bench seat 18 and the stand platform 20 can be disposed on the lower section, such as the rear leg member 24. The bench seat 18 can be rotated relative to the rear leg member 24. The stand platform 20 can be adjacent to the bench seat 18; a child can step on the stand platform 20 comfortably when sitting the bench seat 18.

Figure 3:
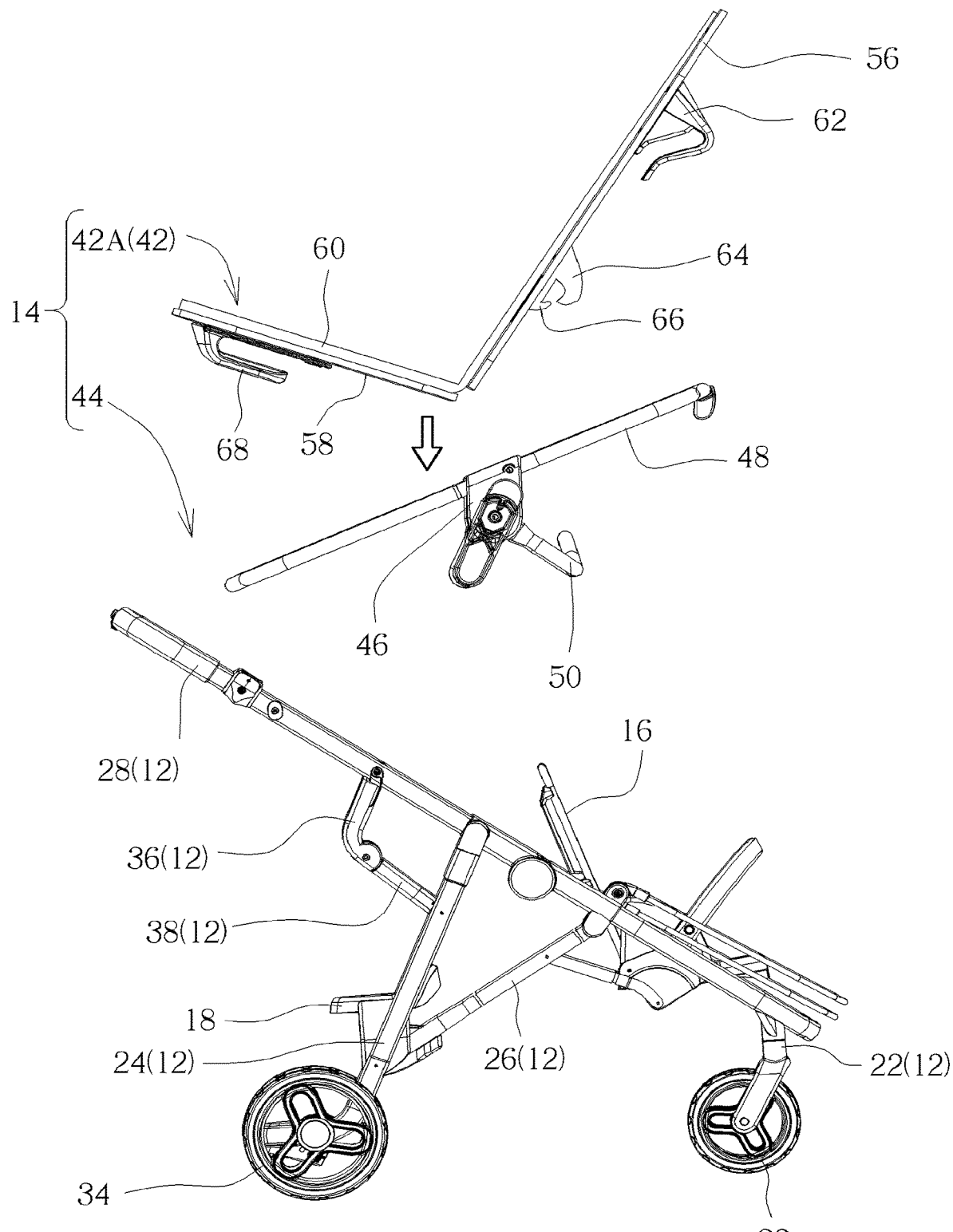
FIG. 3 and FIG. 4 are diagrams of a first seat in different assembly phases according to one embodiment of the present invention.
Figure 4:
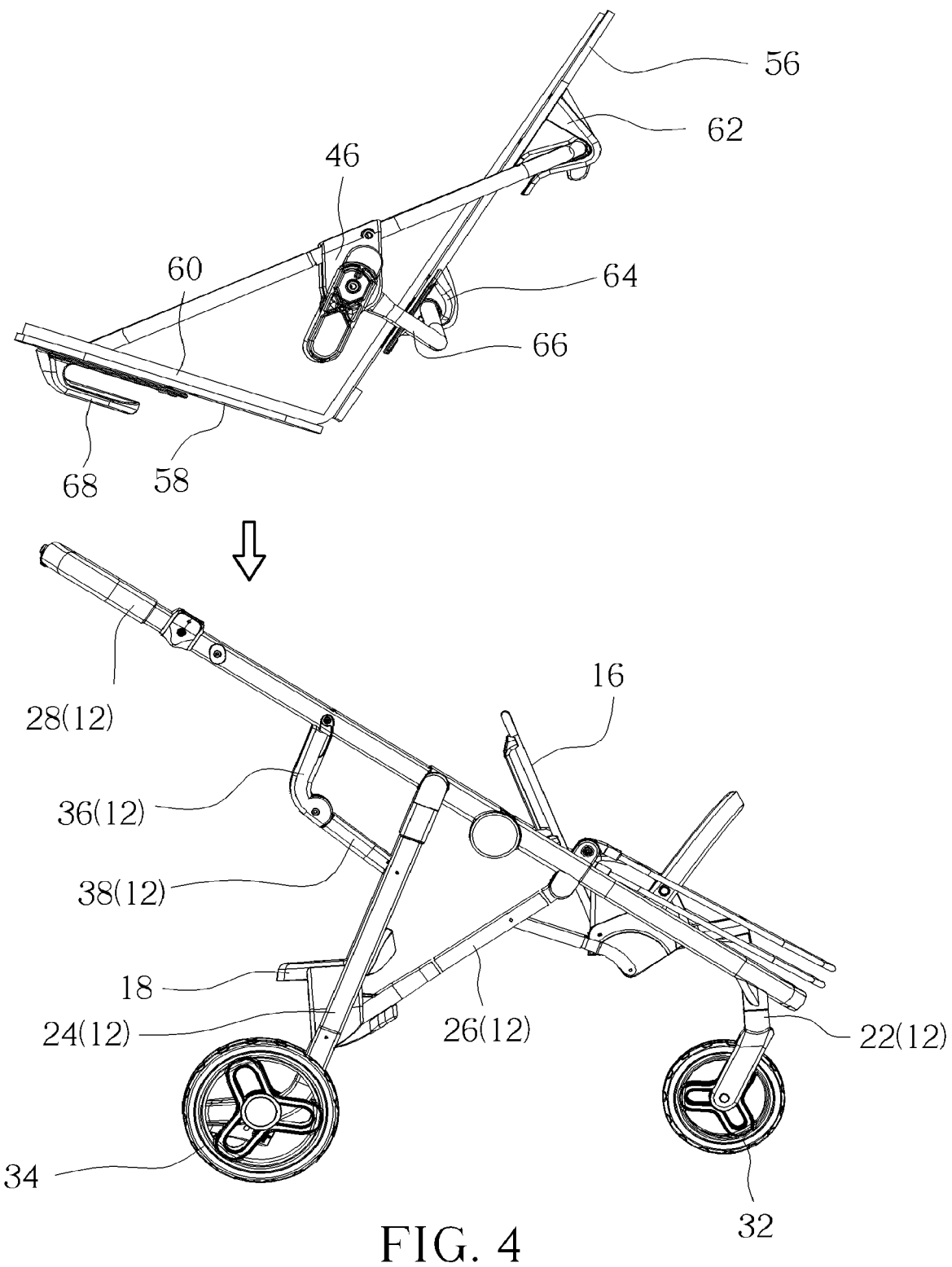
Figure 5:
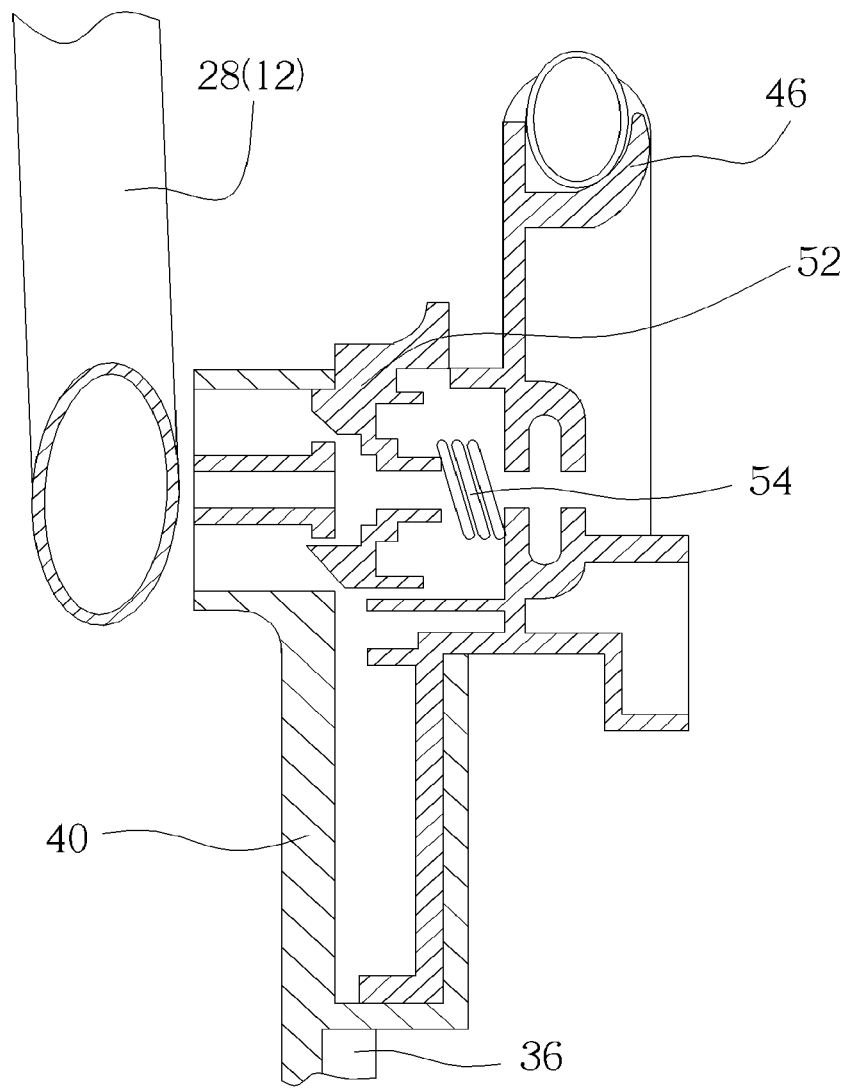
FIG. 5 is a sectional view of a first seat link and a seat hub according to the embodiment of the present invention.

Please refer to FIG. 1 to FIG. 5. FIG. 3 and FIG. 4 are diagrams of the first seat 14 in different assembly phases according to one embodiment of the present invention. FIG. 5 is a sectional view of the first seat link 36 and the seat hub 46 according to the embodiment of the present invention. The first seat 14 can include a supporting unit 42 and a first seat frame 44. The first seat frame 44 can hold the supporting unit 42. The first seat frame 44 can include a seat hub 46, an upper seat tube 48 and a lower seat tube 50. The seat hub 46 can include a latching portion 52. The latching portion 52 can be detachably disposed on the assembling portion 40 of the first seat link 36, so as to stably fix the first seat frame 44 on the stroller frame 12. The latching portion 52 may be moved from an unlocking position to a locking position optionally via a spring 54, as shown in FIG. 5.

The upper seat tube 48 can be disposed above the seat hub 46. The lower seat tube 50 can be disposed under the seat hub 46. The supporting unit 42 can be slidably disposed on the upper seat tube 48. The lower seat tube 50 can be detachably connected to the supporting unit 42. In one embodiment, the upper seat tube 48 can be rotated relative to the stroller frame 12 via the seat hub 46. The lower seat tube 50 can be movably connected to the seat hub 46. When the stroller frame 12 is folded, the lower seat tube 50 can move the supporting unit 42 relative to the upper seat tube 48 for unfolding the supporting unit 42, and a size of the supporting unit 42 can be decreased accordingly.

Furthermore, the supporting unit 42 can be a first seat unit 42A. The first seat unit 42A can include a first seat back 56 and a first seat body 58. The first seat back 56 can be detachably connected to an upper end of the upper seat tube 48 in a slidable manner. The first seat body 58 can be detachably connected to a lower end of the upper seat tube 48 in the slidable manner. The first seat unit 42A can further include a textile product 60 disposed on the first seat back 56 and the first seat body 58. The textile product 60 can slide the first seat back 56 or the first seat body 58 relative to the upper seat tube 48 when the stroller frame 12 is folded or unfolded, so that the first seat unit 42A can be easily folded and unfolded.

The first seat back 56 can include an upper sliding slot portion 62, a lower sliding slot portion 64 and a resilient locking portion 66. The resilient locking portion 66 can be disposed on a position adjacent to the lower sliding slot portion 64. The upper sliding slot portion 62 can be assembled with an upper end of the upper seat tube 48. The lower sliding slot portion 64 can be assembled with the lower seat tube 50. The resilient locking portion 66 can block the lower seat tube 50 to prevent the lower seat tube 50 and the lower sliding slot portion 64 from separation, which results in the first seat unit 42A removed from the first seat frame 44. In addition, the first seat body 58 can include a front sliding slot portion 68 assembled with a lower end of the upper seat tube 48. If the upper sliding slot portion 62 is separated from the upper seat tube 48 and the resilient locking portion 66 is unlocked to disassemble the lower sliding slot portion 64 from the lower seat tube 50, the first seat back 56 can be removed from the first seat frame 44. If the front sliding slot portion 68 and the upper seat tube 48 are disassembled, the first seat body 58 can be removed from the first seat frame 44.

Thus, as shown in FIG. 3 and FIG. 4, the upper sliding slot portion 62 of the first seat back 56 can be assembled with the upper seat tube 48, and the lower seat tube 50 can be clipped by the lower sliding slot portion 64 and the resilient locking portion 66, so that the first seat back 56 can be stably disposed on the first seat frame 44. The front sliding slot portion 68 of the first seat body 58 can be assembled with the upper seat tube 48, and the first seat body 58 can be assembled with the first seat frame 44. Then, the textile product 60 can be installed on the first seat back 56 and the first seat body 58, and the latching portion 52 of the seat hub 46 can be assembled with the assembling portion 40 of the first seat link 36, so the first seat 14 can stably disposed on the stroller frame 12.

Figure 6:
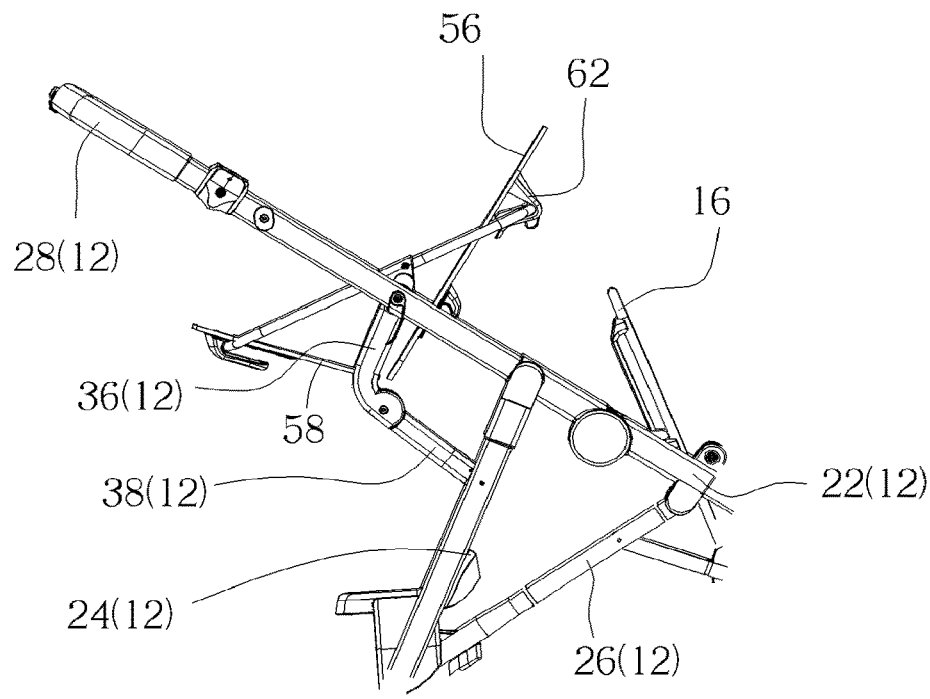
FIG. 6 to FIG. 8 are diagrams of the first seat in folding and unfolding modes according to the embodiment of the present invention.
Figure 7:
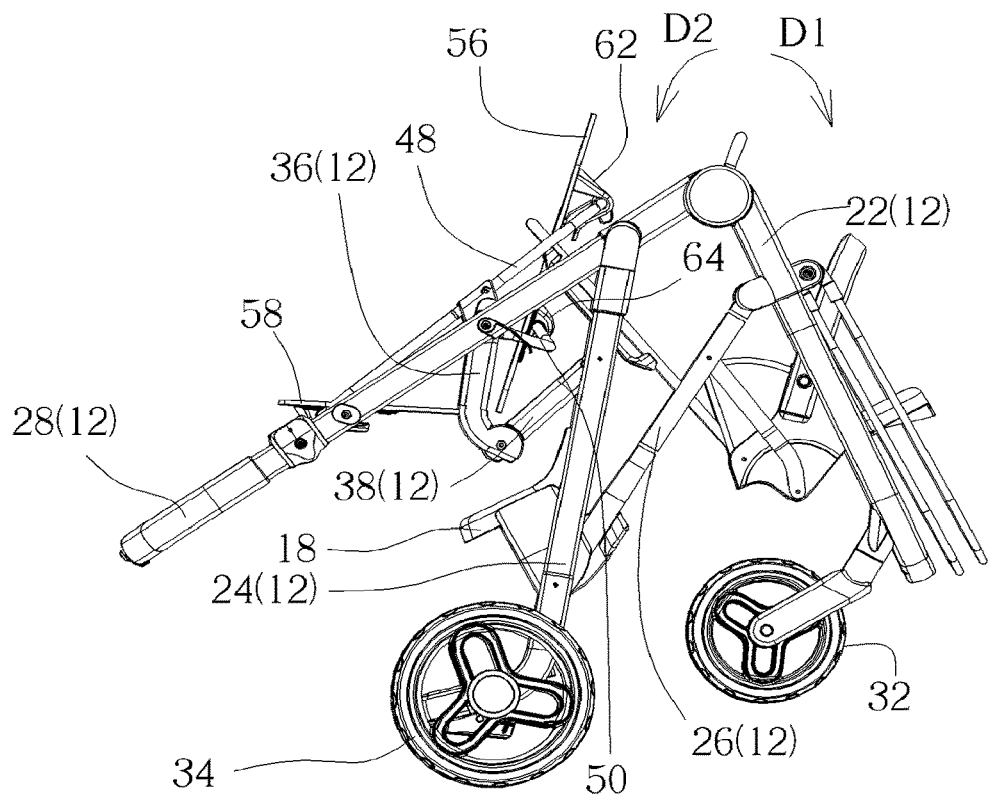
Figure 8:
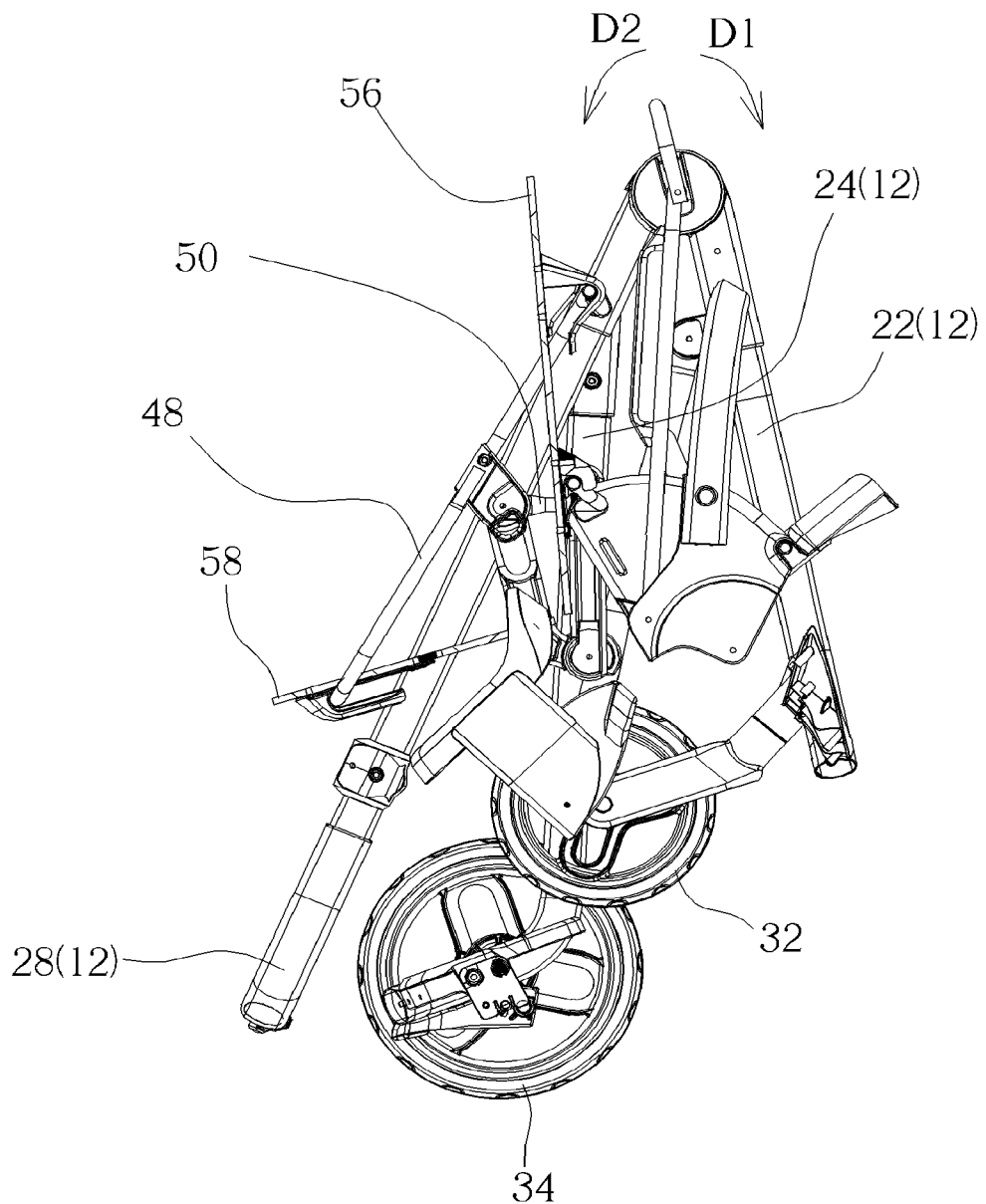

Please refer to FIG. 1 to FIG. 8. FIG. 6 to FIG. 8 are diagrams of the first seat 14 in folding and unfolding modes according to one embodiment of the present invention. As shown in FIG. 6, when the child stroller 10 is prepared to fold, the fastening member 30 can be lifted to rotate the front leg member 22 in a first rotary direction D1 and rotate the handle member 28 in a second rotary direction D2. As shown in FIG. 7, an included angle between the rear leg member 24 and the supporting member 26 can be reduced in response to the folded child stroller 10, and an included angle between the first seat link 36 and the second seat link 38 can be reduced accordingly; meanwhile, the first seat 14 still can be kept in the unfolding mode.

As shown in FIG. 8, when the stroller frame 12 is folded to abut the lower seat tube 50 against the second seat 16, the lower seat tube 50 can be moved along a surface of the second seat 16 and rotated relative to the seat hub 46 in the second rotary direction D2. The lower sliding slot portion 64 can be pressed by rotation of the lower seat tube 50, and the first seat back 56 can be moved relative to the upper seat tube 48 via the upper sliding slot portion 62; in the meantime, the textile product 60 can move the first seat body 58 relative to the upper seat tube 48 via the front sliding slot portion 68. It is to say, the lower seat tube 50 can press and move the first seat unit 42A close to the first seat frame 44, so as to unfold the first seat back 56 and the first seat body 58.

Figure 9:
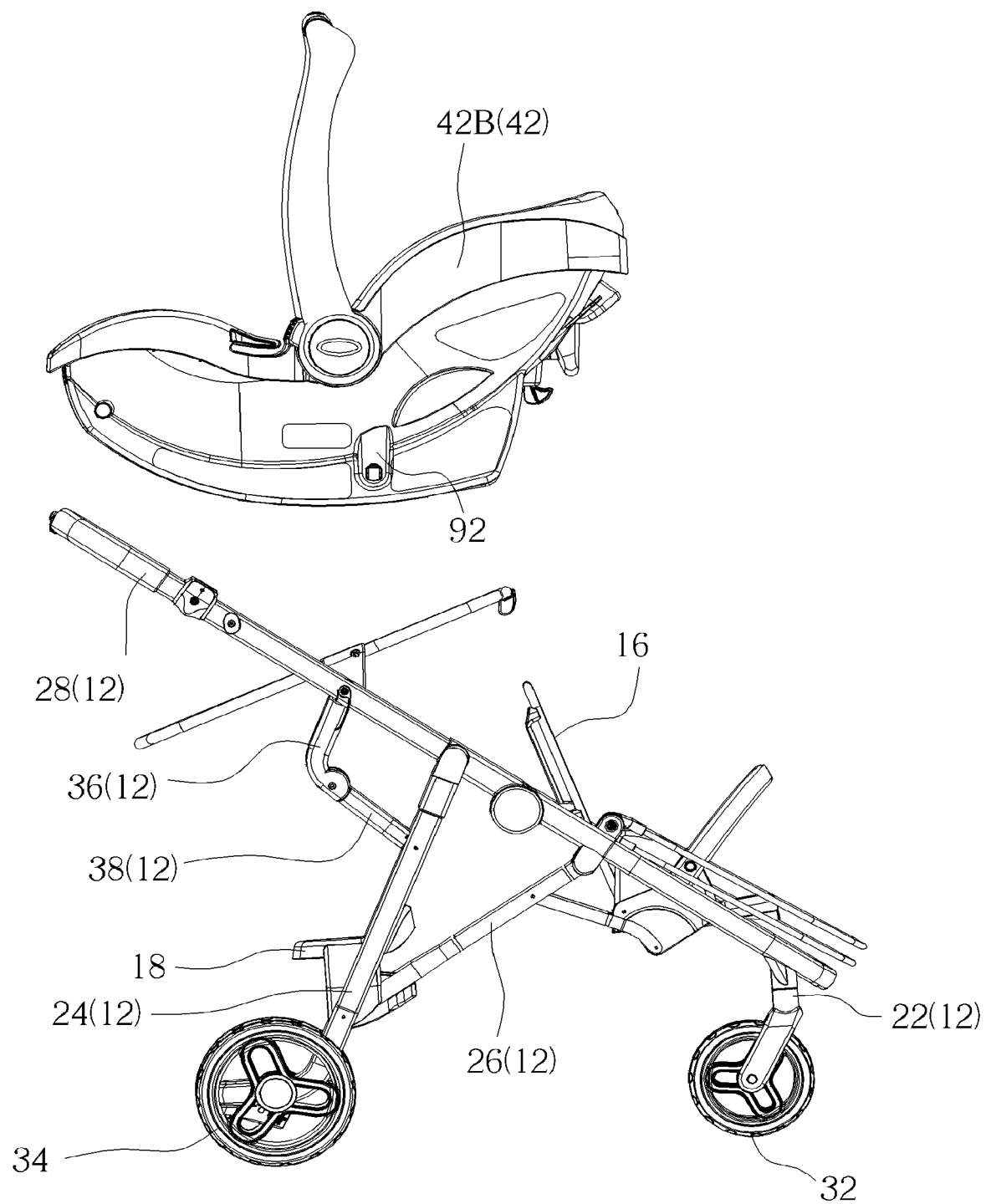
FIG. 9 is a diagram of the first seat in another mode according to the embodiment of the present invention.

Please refer to FIG. 9. FIG. 9 is a diagram of the first seat 14 in another mode according to the embodiment of the present invention. The supporting unit 42 of the first seat 14 may be an infant carrier 42B, and the infant carrier 42B can include a bolting component 92. When the first seat unit 42A is removed from the first seat frame 44, the first seat unit 42A can be replaced by the infant carrier 42B, and the infant carrier 42B can be detachably disposed on the seat hub 46 via the bolting component 92.

Figure 10:
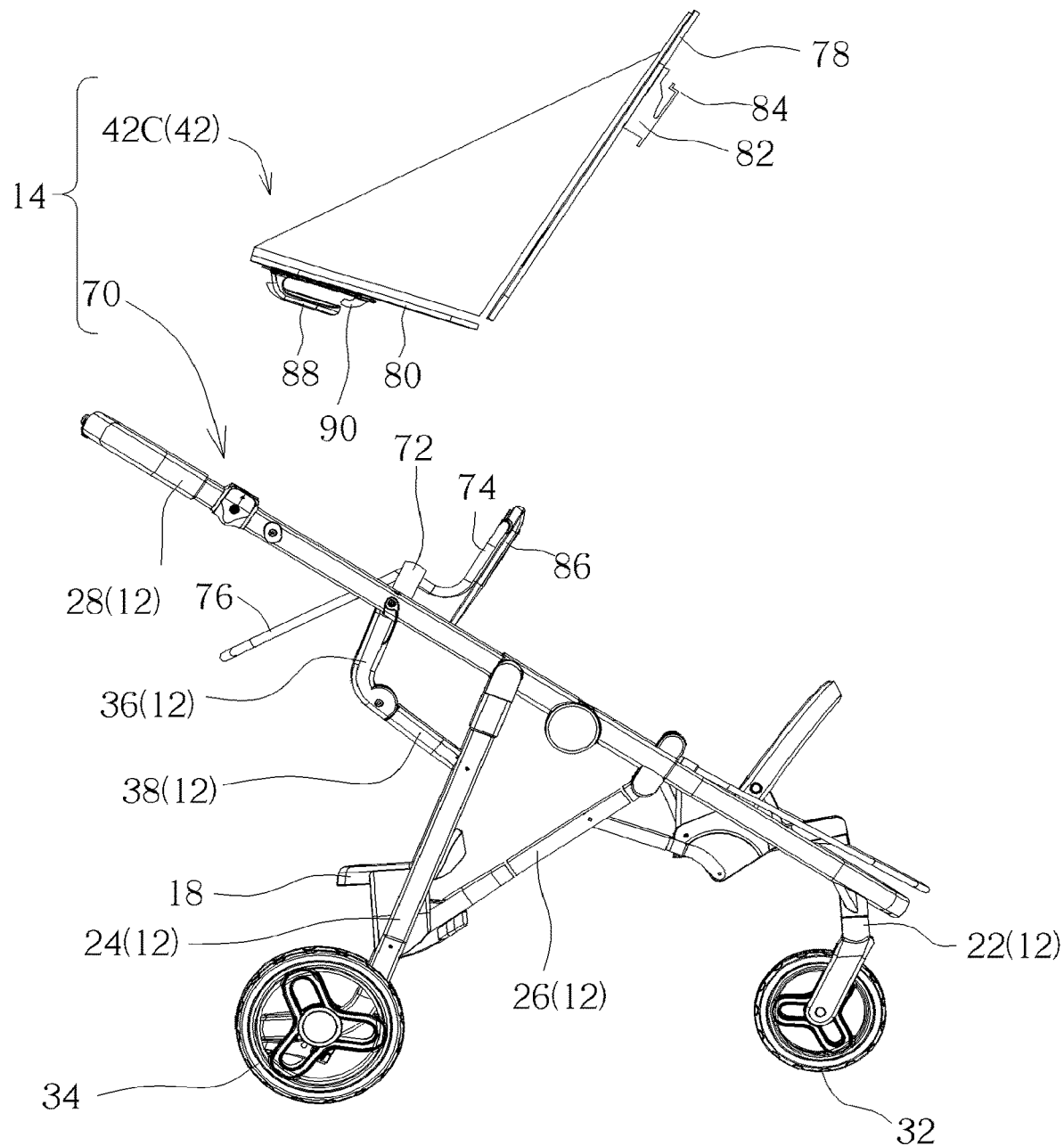
FIG. 10 and FIG. 11 are diagrams of the first seat in different assembly phases according to another embodiment of the present invention.
Figure 11:
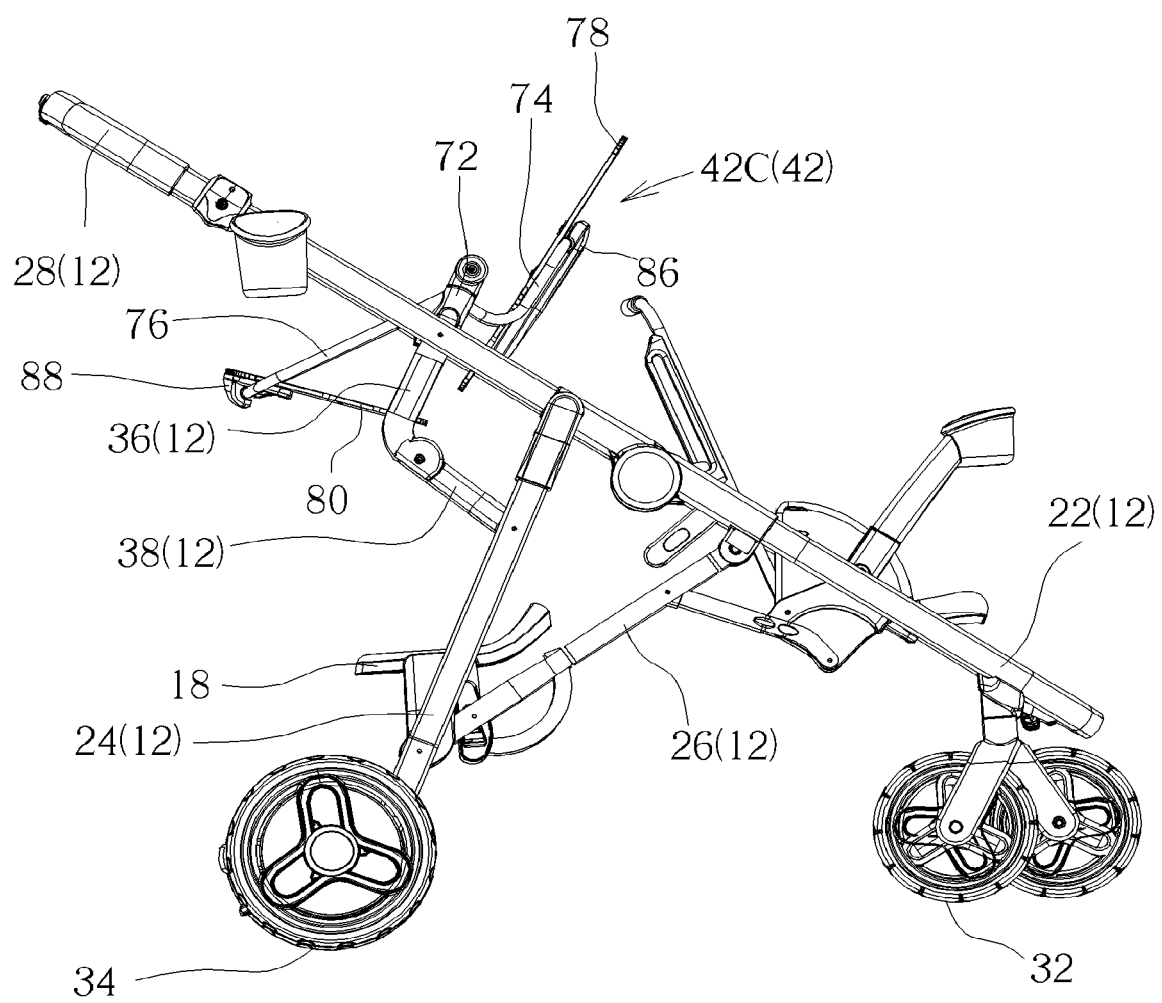

Please refer to FIG. 10 and FIG. 11. FIG. 10 and FIG. 11 are diagrams of the first seat 14 in different assembly phases according to another embodiment of the present invention. In the embodiment, the first seat 14 can include the supporting unit 42 and a first seat frame 70, and the supporting unit 42 can be a first seat unit 42C. The first seat frame 70 can include a seat hub 72, an upper seat tube 74 and a lower seat tube 76. The seat hub 72 can include a latching portion (not shown in the figures), and have function similar to the latching portion 52 of the seat hub 46. The upper seat tube 74 and the lower seat tube 76 can be disposed on the seat hub 72, and can be rotated relative to the stroller frame 12 via the seat hub 72. The first seat unit 42C can include a first seat back 78 and a first seat body 80. The first seat back 78 can be engaged with the upper seat tube 74, and the first seat body 80 can be engaged with the lower seat tube 76.

The first seat back 78 can include a first engaging portion 82 and a resilient constraining portion 84. The upper seat tube 74 can include a second engaging portion 86. The first engaging portion 82 can slidably engaged with the second engaging portion 86, and the resilient constraining portion 84 can abut against part of the second engaging portion 86 to constrain relative motion between the first engaging portion 82 and the second engaging portion 86, for stably installing the first seat back 78 on the upper seat tube 74. Besides, the first seat body 80 can include a clipping portion 88 and a resilient restraining portion 90. The clipping portion 88 can clip the lower seat tube 76. The resilient restraining portion 90 can abut against part of the lower seat tube 76, so as to prevent the lower seat tube 76 and the clipping portion 88 from separation for stably installing the first seat body 80 on the lower seat tube 76.

Figure 12:
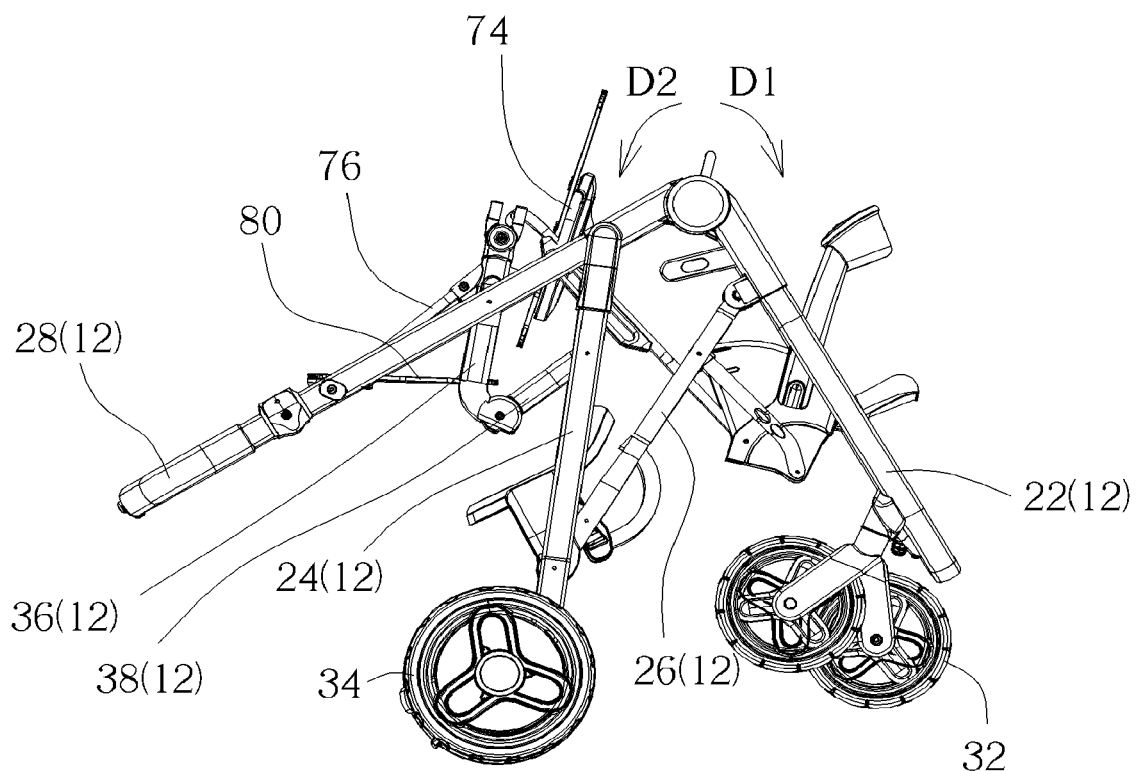
Figure 13:
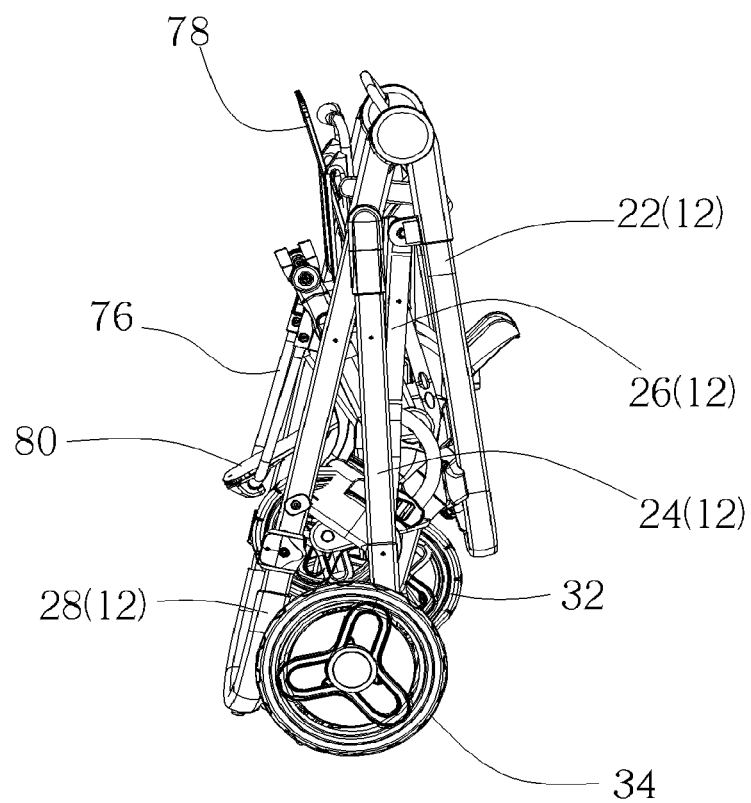

Please refer to FIG. 10 to FIG. 13. FIG. 11 to FIG. 13 are diagram of the first seat 14 in folding and unfolding phases according to the embodiment of the present invention. As shown in FIG. 11 and FIG. 12, when the child stroller 10 is prepared to fold, the fastening member 30 can be lifted to rotate the front leg member 22 in the first rotary direction D1 and rotate the handle member 28 in the second rotary direction D2. The included angle between the rear leg member 24 and the supporting member 26 can be reduced in response to the folded child stroller 10, and the included angle between the first seat link 36 and the second seat link 38 can be reduced accordingly. As shown in FIG. 12 and FIG. 13, when the stroller frame 12 is folded, the first seat unit 42C and the first seat frame 70 of the first seat 14 can be stored inside members of the stroller frame 12 to minimize the size of the child stroller 10.

Figure 14:
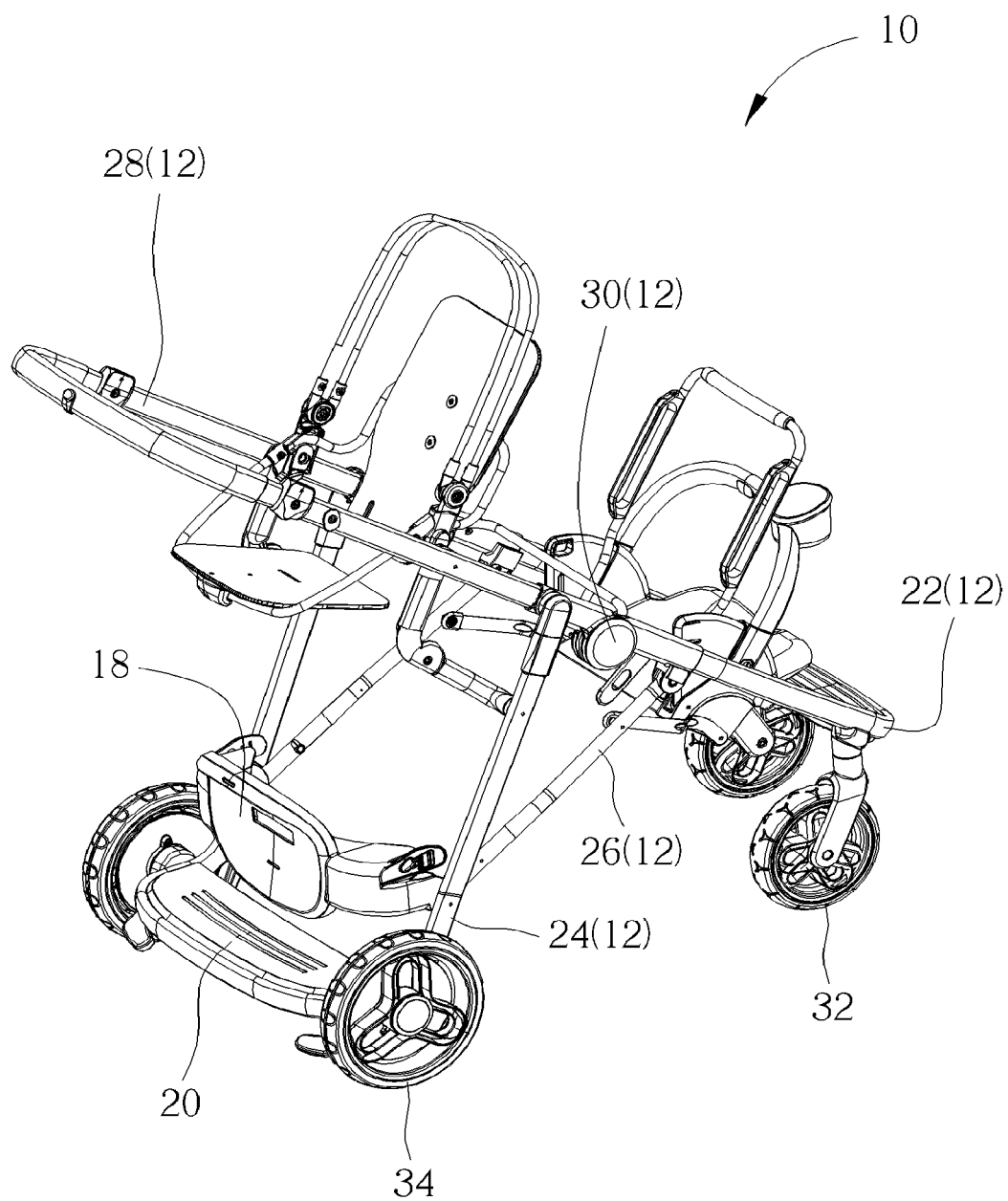
FIG. 14 is a diagram of a bench seat in the non-service mode according to the embodiment of the present invention.
Figure 15:
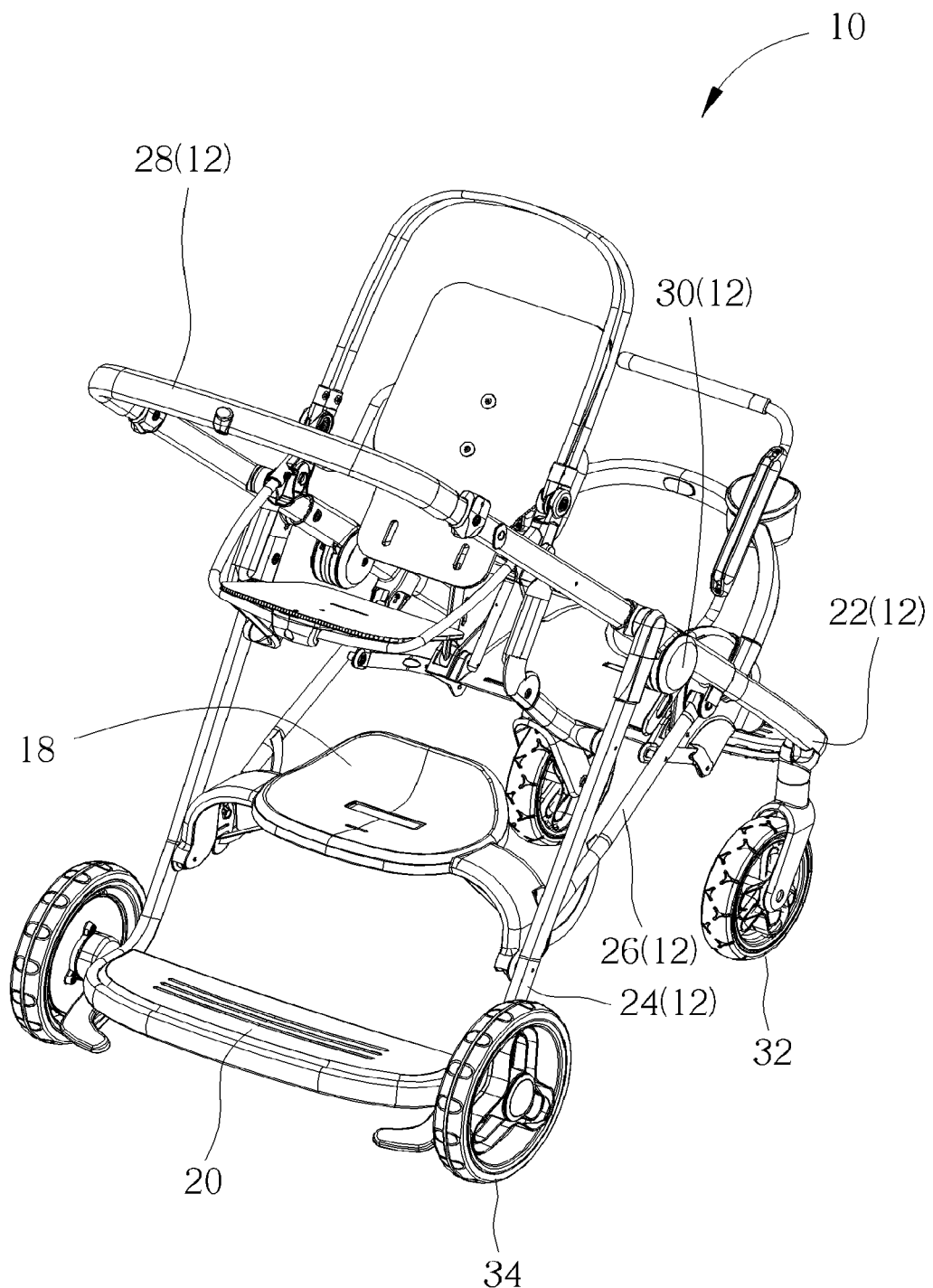
FIG. 15 is a diagram of the bench seat in the service mode according to the embodiment of the present invention.
Figure 16:
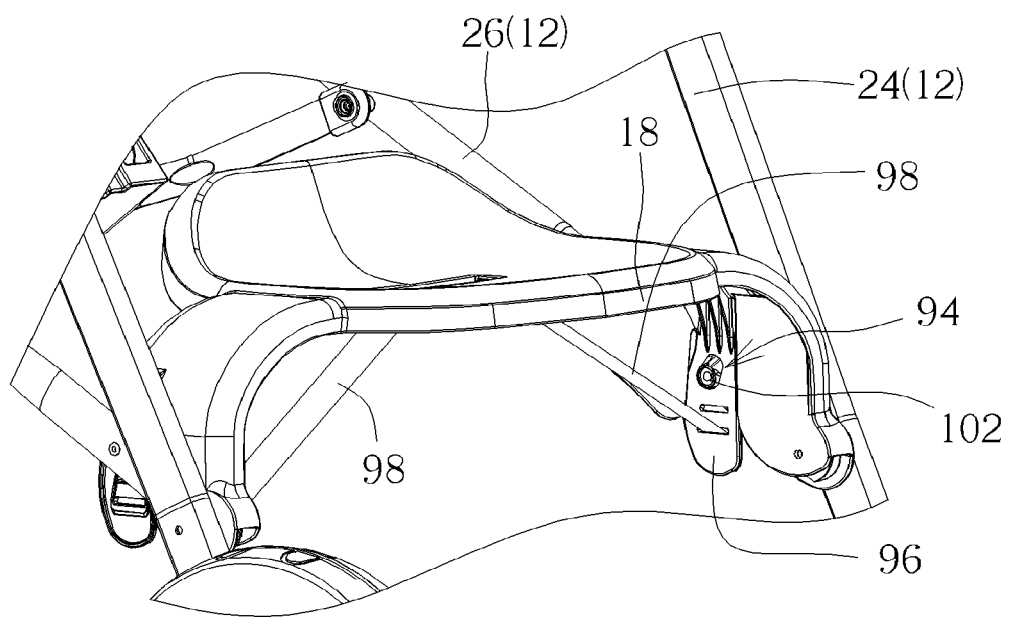
FIG. 16 to FIG. 18 are diagrams of the bench seat in different phases according to the embodiment of the present invention.
Figure 17:
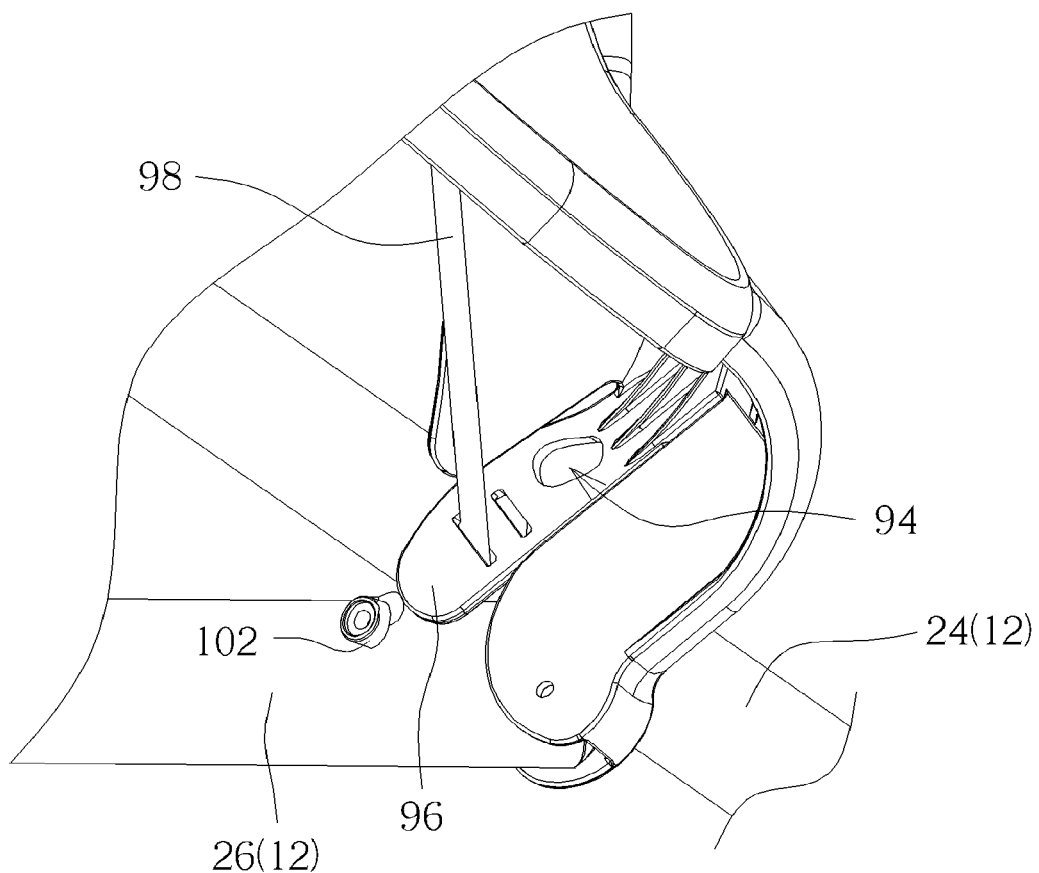
Figure 18:
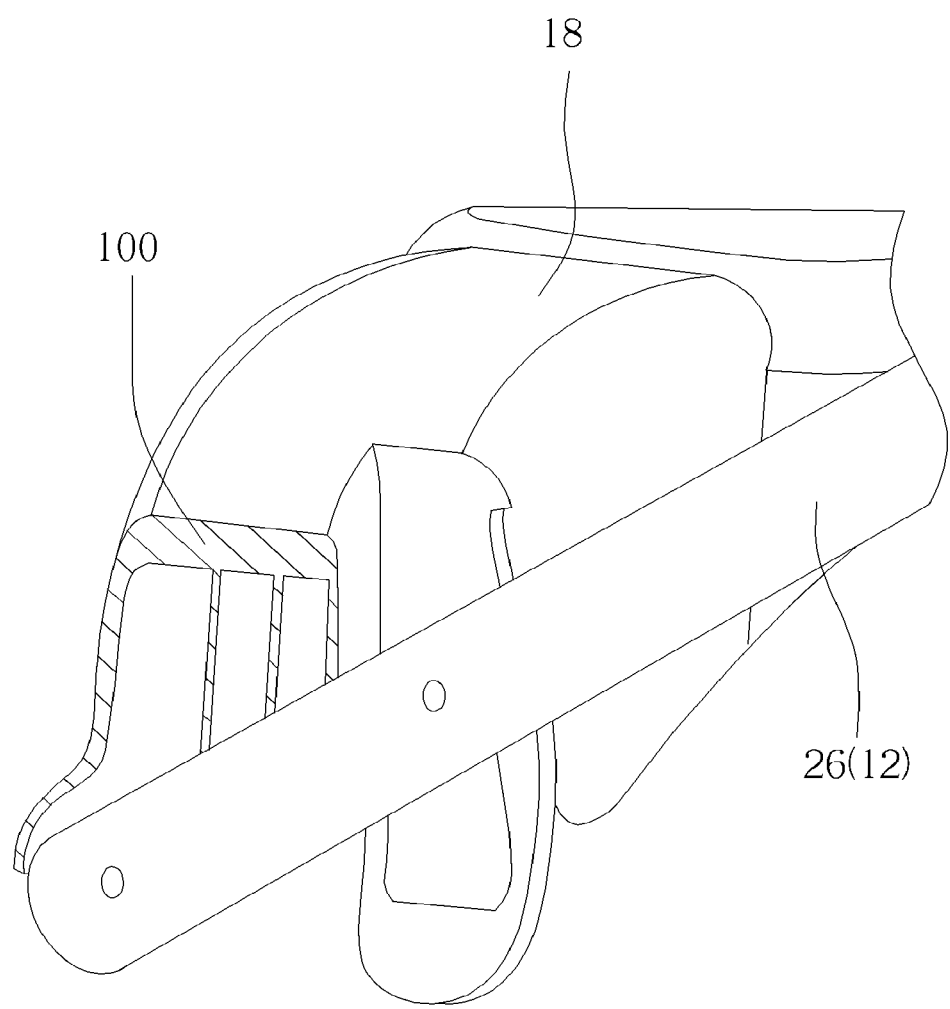

Please refer to FIG. 14 to FIG. 18. FIG. 14 is a diagram of the bench seat 18 in the non-service mode according to the embodiment of the present invention. FIG. 15 is a diagram of the bench seat 18 in the service mode according to the embodiment of the present invention. FIG. 16 to FIG. 18 are diagrams of the bench seat 18 in different phases according to the embodiment of the present invention. The bench seat 18 can be rotatably connected to the rear leg member 24 and the supporting member 26 of the stroller frame 12. As shown in FIG. 14, the bench seat 18 can be rotated outward, and a seat surface of the bench seat 18 faces the lateral, so the child cannot sit the bench seat 18; meanwhile, a bottom of the child stroller 10 can provide large storage space. As shown in FIG. 15, the bench seat 18 can be rotated inward, and the seat surface of the bench seat 18 faces the top, so the child can sit the bench seat 18 and step on the stand platform 20.

The bench seat 18 can include a first buckling portion 94, a resilient plate portion 96, an actuating component 98 and a rib structure 100. The resilient plate portion 96 can be stretched from a side of the seat surface of the bench seat 18 downwardly. The first buckling portion 94 can be formed on the resilient plate portion 96. The actuating component 98 can be connected to the resilient plate portion 96, and optionally stretch toward the seat surface of the bench seat 18. The rib structure 100 can be disposed inside the bench seat 18 and adjacent to the supporting member 26. The supporting member 26 can include a second buckling portion 102. The second buckling portion 102 can include an inclined guiding surface structure used to conveniently buckle the first buckling portion 94 and the second buckling portion 102. When the first buckling portion 94 is assembled with the second buckling portion 102, the bench seat 18 cannot rotate and be positioned at the service mode. If the bench seat 18 is prepared to switch into the non-service mode, the actuating component 98 can be pulled from the seat surface of the bench seat 18, and the resilient plate portion 96 can be resiliently deformed by pulling of the actuating component 98, so that the first buckling portion 94 and the second buckling portion 102 can be separated and the bench seat 18 can be freely rotated. The rib structure 100 can abut against the supporting member 26 to constrain a rotary angle of the bench seat 18 in a specific situation.

In conclusion, when the child stroller of the present invention is folded and unfolded, the first seat can be stored inside the stroller frame via actuation of the first seat link and the second seat link; besides, the supporting unit can be pulled by the first seat frame of the first seat, so the seat back and the seat body of the supporting unit can be rotated relative to each other for minimizing the folding size of the child stroller. Moreover, the bench seat can be rotated relative to the stroller frame of the child stroller. The child can sit the bench seat in the service mode and step on the stand platform. The storage space of the child stroller can be enlarged in response to the bench seat switched into the non-service mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A seat for a child stroller, comprising:
   a supporting unit; and
   a seat frame configured to hold the supporting unit, the seat frame comprising:
   a seat hub;
   an upper seat member disposed on the seat hub, the supporting unit being slidably disposed on the upper seat member; and
   a lower seat member disposed on the seat hub and detachably connected to the supporting unit.

2. The seat of claim 1, wherein the seat hub is configured to allow the upper seat member to rotate relative to a frame of the child stroller, and wherein the lower seat member is movably connected to the seat hub and configured to slide the supporting unit relative to the upper seat member when the child stroller is folded.

3. The seat of claim 2, wherein the seat hub is configured to removably couple the upper seat member and the lower seat member to the child stroller.

4. The seat of claim 2, wherein the upper and lower seat members are coupled to the seat hub so that the upper seat member and the lower seat member are configured to rotate relative to the frame as the child stroller is folded.

5. The seat of claim 1, wherein the supporting unit includes a seat unit detachably coupled to the seat frame and wherein the seat unit comprises a seat back and a seat body detachably coupled to the seat frame.

6. The seat of claim 5, wherein the seat back is slidably connected to an upper end of the upper seat member and the seat body is slidably connected to a lower end of the upper seat member.

7. The seat of claim 5, wherein, when the seat unit is coupled to the seat frame, the seat back is coupled to the upper seat member and the seat body is coupled to the lower seat member.

8. The seat of claim 6, wherein the seat unit is coupled to the seat frame so that one of the seat back and the seat body moves relative to the upper seat member when the child stroller is folded.

9. The seat of claim 6, wherein the seat back comprises an upper sliding slot portion and a lower sliding slot portion, the upper sliding slot portion being assembled with the upper end of the upper seat member and the lower sliding slot portion being assembled with the lower seat member.

10. The seat of claim 9, wherein the seat back further comprises a resilient locking portion disposed on the lower sliding slot portion and adapted to block the lower seat member preventing the seat unit from separating from the seat frame.

11. The seat of claim 10, wherein the seat back is removed from the seat frame by separating the upper sliding slot portion from the upper seat member and by unlocking the resilient locking portion to separate the lower sliding slot portion from the lower seat member.

12. The seat of claim 6, wherein the seat body comprises a front sliding slot portion assembled with the lower end of the upper seat member.

13. The seat of claim 12, wherein the seat body is separated from the seat frame by separating the front sliding slot portion from the upper seat member.

14. The seat of claim 7, wherein the seat back comprises a first engaging portion and a resilient constraining portion and the upper seat member comprises a second engaging portion slidably engaged with the first engaging portion, the resilient constraining portion abutting against part of the second engaging portion to constrain relative motion between the first and second engaging portions.

15. The seat of claim 14, wherein the seat body comprises a clipping portion and a resilient restraining portion, the clipping portion clips a lower seat tube, the resilient restraining portion abutting against the lower seat tube to prevent the lower seat tube and the clipping portion from separation.

16. A stroller, comprising:
a seat of claim 1; and
a stroller frame having two sections capable of being folded and unfolded relative to each other, the seat frame being coupled to one of the two sections of the stroller frame.

17. The stroller of claim 16, wherein the stroller frame includes a front leg member, a rear leg member, a supporting member and a handle member, the supporting member being rotatably disposed between the front leg member and the rear leg member wherein the front leg member is rotatably connected to an end of the handle member and the rear leg member is rotatably connected to a portion of the handle member adjacent to the end of the handle member.

18. The stroller of claim 17, wherein the stroller frame further comprises a fastening member disposed between the front leg member and the handle member, and adapted to lock a relative position between the front leg member and the handle member to hold the stroller frame in one of a folding mode and a service mode.

19. The stroller of claim 17, wherein the stroller frame further comprises a first seat link and a second seat link, a lower end of the second seat link is rotatably disposed on the rear leg member, two ends of the first seat link being rotatably connected to an upper end of the second seat link and the handle member.

* * * * *